United States Patent
Wier et al.

(10) Patent No.: US 11,593,752 B2
(45) Date of Patent: Feb. 28, 2023

(54) SYSTEMS AND METHODS FOR MANAGING AND/OR FACILITATING RETURN SHIPMENT OF ITEMS

(71) Applicant: Auctane, LLC, Austin, TX (US)

(72) Inventors: Byron J. Wier, Austin, TX (US); John Roland Clem, Manhattan Beach, CA (US)

(73) Assignee: Auctane, LLC, Austin, TX (US)

( * ) Notice: Subject to any disclaimer, the term of this patent is extended or adjusted under 35 U.S.C. 154(b) by 70 days.

(21) Appl. No.: 17/322,127

(22) Filed: May 17, 2021

(65) Prior Publication Data

US 2021/0272060 A1    Sep. 2, 2021

Related U.S. Application Data

(63) Continuation of application No. 14/711,618, filed on May 13, 2015, now Pat. No. 11,010,706.

(51) Int. Cl.
    *G06Q 10/08*      (2012.01)
    *G06Q 10/0837*    (2023.01)

(52) U.S. Cl.
    CPC .................. *G06Q 10/0837* (2013.01)

(58) Field of Classification Search
    CPC .................................. G06Q 10/0837
    See application file for complete search history.

(56) References Cited

U.S. PATENT DOCUMENTS

| | | |
|---|---|---|
| 4,807,139 A | 2/1989 | Liechti |
| 4,812,994 A | 3/1989 | Taylor et al. |
| 5,010,485 A | 4/1991 | Bigari |
| 5,121,327 A | 6/1992 | Salazar |
| 5,822,739 A | 10/1998 | Kara |
| 6,381,590 B1 | 4/2002 | Debois |
| 6,385,731 B2 | 5/2002 | Ananda |
| 6,424,954 B1 | 7/2002 | Leon |
| 6,526,393 B1 | 2/2003 | Fredman |

(Continued)

FOREIGN PATENT DOCUMENTS

EP    1785856 A2    5/2007

OTHER PUBLICATIONS

<http://www.endicia.com/about-us/press-room/20140610>, last accessed May 13, 2015, pp. 1-2.

(Continued)

*Primary Examiner* — Ramsey Refai
(74) *Attorney, Agent, or Firm* — Norton Rose Fulbright US LLP

(57) ABSTRACT

Systems and methods which facilitate return shipment of items, such as to provide for the return of goods from a purchaser to a merchant, are shown. Embodiments provide shipping management functionality for managing return requests, processing of return requests, authorizing returns, tracking of the processing of a return request, and/or tracking of return shipments. A shipping management system of embodiments operates to make shipping functionality and/or information utilized with respect to return shipments, which may not otherwise be readily available to the return shipper, conveniently accessible for use by the return shipper. Embodiments provide for some or all return shipping fees to be borne by the merchant rather than the return shipper.

20 Claims, 2 Drawing Sheets

(56) References Cited

U.S. PATENT DOCUMENTS

| | | | |
|---|---|---|---|
| 6,889,214 B1 | 5/2005 | Pagel et al. | |
| 7,149,726 B1 | 12/2006 | Lingle et al. | |
| 7,177,825 B1 | 2/2007 | Borders et al. | |
| 7,233,929 B1 | 6/2007 | Lingle et al. | |
| 7,243,842 B1 | 7/2007 | Leon et al. | |
| 7,383,194 B2 | 6/2008 | Heiden et al. | |
| 7,409,353 B1 | 8/2008 | Uslontsev et al. | |
| 7,430,424 B2 | 9/2008 | Kraft et al. | |
| 7,444,290 B2 | 10/2008 | Woods et al. | |
| 7,458,612 B1 | 12/2008 | Bennett | |
| 7,660,721 B2 * | 2/2010 | Williams | G06Q 30/0601 705/330 |
| 7,756,796 B2 | 7/2010 | Bodie et al. | |
| 7,765,168 B1 | 7/2010 | Dong et al. | |
| 7,827,118 B1 | 11/2010 | Smith, III et al. | |
| 7,882,042 B2 | 2/2011 | Meyer et al. | |
| 8,005,762 B2 | 8/2011 | Ogg et al. | |
| 8,255,337 B1 | 8/2012 | Bennett et al. | |
| 8,521,656 B2 * | 8/2013 | Zimberoff | G06Q 30/0641 705/330 |
| 8,600,913 B2 | 12/2013 | Williams et al. | |
| 8,738,542 B2 * | 5/2014 | Malsbenden | G06Q 30/0202 705/28 |
| 9,082,234 B1 | 7/2015 | Clem | |
| 9,761,061 B1 | 9/2017 | Bussell et al. | |
| 9,823,909 B1 | 11/2017 | Kuo et al. | |
| 9,824,380 B1 | 11/2017 | Chowdhary et al. | |
| 9,842,308 B1 | 12/2017 | Biswas et al. | |
| 9,922,302 B2 | 3/2018 | Gventer et al. | |
| 11,315,066 B2 * | 4/2022 | Deshpande | G06Q 10/0837 |
| 2002/0161707 A1 | 10/2002 | Cole et al. | |
| 2003/0009425 A1 | 1/2003 | Stonedahl et al. | |
| 2003/0088473 A1 | 5/2003 | Fisher et al. | |
| 2003/0089765 A1 | 5/2003 | Kovlakas | |
| 2003/0101147 A1 | 5/2003 | Montgomery et al. | |
| 2004/0044586 A1 | 3/2004 | Gullo et al. | |
| 2004/0083179 A1 | 4/2004 | Sesek et al. | |
| 2004/0212833 A1 | 10/2004 | Taskett et al. | |
| 2005/0060165 A1 | 3/2005 | Knight et al. | |
| 2006/0173799 A1 | 8/2006 | Minnocci | |
| 2006/0213979 A1 | 9/2006 | Geller et al. | |
| 2006/0213980 A1 | 9/2006 | Geller et al. | |
| 2006/0224462 A1 | 10/2006 | Brezenoff | |
| 2006/0229895 A1 | 10/2006 | Kodger | |
| 2007/0073551 A1 | 3/2007 | Williams et al. | |
| 2007/0174213 A1 | 7/2007 | Whitehouse et al. | |
| 2008/0004981 A1 | 1/2008 | Gopalpur et al. | |
| 2008/0103968 A1 | 5/2008 | Bies et al. | |
| 2008/0133659 A1 | 6/2008 | Aldrey et al. | |
| 2008/0169343 A1 | 7/2008 | Skaaksrud et al. | |
| 2009/0146410 A1 | 6/2009 | Uslontsev et al. | |
| 2009/0172084 A1 | 7/2009 | Lavanya et al. | |
| 2009/0172126 A1 | 7/2009 | Brennan et al. | |
| 2009/0265585 A1 | 10/2009 | Ikegami | |
| 2010/0076903 A1 | 3/2010 | Klingenberg et al. | |
| 2010/0179892 A1 | 7/2010 | O'Brien et al. | |
| 2010/0250549 A1 | 9/2010 | Muller et al. | |
| 2010/0323722 A1 | 12/2010 | Hatami | |
| 2011/0029429 A1 | 2/2011 | Whitehouse | |
| 2011/0133888 A1 | 6/2011 | Stevens et al. | |
| 2011/0231334 A1 | 9/2011 | Jindel | |
| 2012/0054754 A1 | 3/2012 | Teichmann et al. | |
| 2012/0084090 A1 | 4/2012 | Woodard et al. | |
| 2012/0109777 A1 | 5/2012 | Lipsitz et al. | |
| 2012/0216133 A1 | 8/2012 | Barker et al. | |
| 2012/0265676 A1 | 10/2012 | Gould et al. | |
| 2013/0056533 A1 | 3/2013 | Zimberoff et al. | |
| 2013/0061337 A1 | 3/2013 | Zimberoff et al. | |
| 2013/0346249 A1 | 12/2013 | Li | |
| 2014/0149308 A1 | 5/2014 | Ming | |
| 2014/0278099 A1 | 9/2014 | Schenken | |
| 2015/0046361 A1 | 2/2015 | Williams et al. | |

OTHER PUBLICATIONS

<http://www.endicia.com/Features/ReturnShippingLabels/>, last accessed May 13, 2015, pp. 1-2.

http://www.newgistics.com/corp returns/#newgisticssmartlabelandshipmentmanager <http://www.newgistics.com/corp returns/> , last accessed May 13, 2015, pp. 1-5.

<http://www.newgistics.com/corp ecommerce/index.aspx>, last accessed May 13, 2015, pp. 1-6.

<https://www.usps.com/returns/>, last accessed May 13, 2015, pp. 1-5.

<https://www.usps.com/business/return-services.htm>, last accessed May 13, 2015, pp. 1-6.

Unpublished U.S. Appl. No. 13/647,001 to Yoggi, filed Oct. 8, 2012 and entitled "Systems and Methods for Providing Shipping Service Guarantees," 44 pages.

Unpublished U.S. Appl. No. 12/316,542 to Leon, filed Dec. 9, 2008 and entitled "Mail Piece Processing," 74 pages.

Unpublished U.S. Appl. No. 13/705,935 to McBride, filed Dec. 5, 2012 and entitled "Visual Graphic Tracking of Item Shipment and Delivery," 62 pages.

Unpublished U.S. Appl. No. 13/828,800 to Atkinson, filed Mar. 14, 2013 and entitled "Systems and Methods for Mail Piece Interception, Rescue Tracking, and Confiscation Alerts and Related Services," 63 pages.

International Search Report and Written Opinion issued for PCT Application No. PCT/US2017/020662, dated May 19, 2017, 14 pages.

Grabara, J. et al. "The Role of Information Systems in Transport Logistics" International Journal of Education and Research, vol. 2, No. 2, Feb. 2014, 8 pages.

* cited by examiner

SYSTEMS AND METHODS FOR MANAGING AND/OR FACILITATING RETURN SHIPMENT OF ITEMS

CROSS-REFERENCE TO RELATED APPLICATIONS

The present application is a continuation of U.S. patent application Ser. No. 14/711,618 filed May 13, 2015 and entitled "SYSTEMS AND METHODS FOR MANAGING AND/OR FACILITATING RETURN SHIPMENT OF ITEMS," which is related to U.S. patent application Ser. No. 14/707,716 filed May 8, 2015 and entitled "SYSTEMS AND METHODS FOR MULTIUSER DATA CONCURRENCY AND DIRECT OBJECT ASSIGNMENT," U.S. patent application Ser. No. 14/753,918 filed Jun. 29, 2015 and entitled "SYSTEMS AND METHODS FOR CLOUD-BASED APPLICATION ACCESS TO RESOURCES," issued Nov. 13, 2018 as U.S. Pat. No. 10,129,172, U.S. patent application Ser. No. 14/642,534 filed Mar. 9, 2015 and entitled "SYSTEMS AND METHODS IMPLEMENTING AUTOMATED SHIPMENT STATUS TRACKING," and U.S. patent application Ser. No. 13/217,896 filed Aug. 25, 2011 and entitled "SYSTEMS AND METHODS FOR VALUE BEARING INDICIA BALANCE RESERVATION," issued Aug. 8, 2017 as U.S. Pat. No. 9,727,860, the disclosures of which are hereby incorporated by reference herein in their entirety.

TECHNICAL FIELD

The invention relates generally to shipment of items and, more particularly, to managing and/or facilitating return shipment of items, such as to provide for the return of goods from a purchaser to a merchant.

BACKGROUND OF THE INVENTION

The shipment of items, such as new and used goods shipped from merchants to purchasers or other recipients, has been commonplace for years. For example, it is commonplace for various merchants, whether they be "brick and mortar" merchants, online merchants, or sellers through an electronic marketplace (e.g., eBay, Amazon Marketplace, etc.), to ship goods using a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), and local and regional couriers With the advent of the Internet and the advent of innumerable e-commerce merchants, not only have the number of items shipped increased appreciably in recent years, but so too have the number of shippers and recipients of such items.

Sometimes there is a need for a recipient to return the items to the merchant, such as where the incorrect item was mistakenly originally shipped, where the item was defective upon receipt, where the recipient elects to take advantage of a liberal merchant return policy, etc. Where the items are initially shipped to the recipient, such a return may necessitate a return shipment from the purchaser or other recipient back to the merchant, particularly where the merchant does not have a brick and mortar location disposed near the returning individual. Managing the return of such items, particularly where shipment of the item by a recipient is involved, can be difficult for a merchant. For example, merely keeping abreast of the particular items for which return has been requested, returned items which are in transit to the merchant, etc. can be daunting.

Further complicating item returns for many merchants is that a number of merchants or online marketplaces (e.g., Amazon, Zappos, etc.) offer free return shipping to purchasers, such as for a marketing differentiator, to alleviate purchasers' consternation regarding engaging in ecommerce, etc. Although other merchants (e.g., smaller merchants, merchants without sophisticated shipment management infrastructure, casual sellers, etc.) may desire to offer similar free return shipping to some or all of their purchasers, they nevertheless may be unable to practicably provide such benefits. For example, offering free returns might be accomplished by including a prepaid return shipping label (e.g., a USPS shipping label having prepaid postage indicia thereon) in each shipment. However, such prepaid shipping labels represent value which, even if unused by the purchaser to return the items, is an expense to the merchant, thus making this an option which is too costly to implement in most scenarios (e.g., only a small portion of purchased goods are expected to be returned in many scenarios, thereby resulting in a large amount of unused postage value "spoiling"). Alternatively, a merchant might provide for such prepaid shipping labels in an ad hoc manner in response to purchaser requests. However, handling such requests and employing logistics to provide such shipping labels to the purchasers using the tools available to merchants today results in this solution being impractical for most merchants (e.g., the management of requests, generating appropriate return shipping labels, and coordinating their being provided to the respective purchasers can be a significant burden).

A number of systems have been developed for use in managing the shipment of items. For example, shipping management systems, such as the SHIPSTATION shipping management system provided by Auctane LLC of Austin Tex., provide functionality for the management of item orders, managing the picking and packing of items for order fulfilment, generation of invoices, packing slips, manifests, shipping labels, and postage or other prepaid shipping indicia, and tracking of shipment of items through a shipping service provider. However, shipping management systems have generally not provided robust functionality with respect to item returns. In particular, shipping management systems have not provided management of return shipment requests and their processing or tracking of the return shipments themselves. Moreover, shipping management systems have heretofore not provided functionality implementing free return shipping.

BRIEF SUMMARY OF THE INVENTION

The present invention is directed to systems and methods which facilitate return shipment of items, such as to provide for the return of goods from a purchaser to a merchant. Embodiments of the invention provide shipping management functionality for managing return requests, processing of return requests, authorizing returns, tracking of the processing of a return request, and/or tracking of return shipments. Additionally or alternatively, embodiments of the invention provide functionality for facilitating the return shipping by a purchaser or other item recipient, such a gift recipient, (collectively referred to herein as a return shipper) to a merchant or other designated source agent, such as a returns processing facility, (collectively referred to herein as a return recipient).

In operation according to embodiments, a shipping management system is adapted to allow a merchant, or their agent, or other original shipper of items to provide for return shipping of such items by purchasers or other recipients of the items. For example, a shipping management system may be adapted to provide an interface for allowing a recipient to request a return, whereby the merchant may elect to authorize the return or not. Additionally or alternatively, embodiments of a shipping management system adapted according to embodiments may provide for a merchant establishing rules for automated authorization of returns, such as to establish that items valued over a predetermined threshold value are provided return authorization, items shipped to or purchased by particular purchasers, classes of purchasers, purchasers meeting predetermined criteria, etc. are provided return authorization, particular classes of items, items meeting predetermined criteria, etc. are provided return authorization, and/or the like.

The return shipment of items by a purchaser or other recipient is facilitated by the merchant or other original shipper, such as though use of a shipping management system adapted according to embodiments of the invention. For example, an interface may be provided within the shipping management system whereby functionality for the generation of return shipping labels, the generation of postage indicia (or other proof of payment for return shipping services), etc. for use with respect to particular return shipments (e.g., returns authorized by the original shipper) is made available to the recipient (now the return shipper). Such an interface may thus make such functionality, which may not otherwise be readily available to the return shipper (e.g., an individual or small business), conveniently accessible for use by the return shipper. Moreover, information utilized with respect to the return shipment (e.g., the particulars of the item being returned, such as weight), which are available in or to the shipping management system, may be utilized by the aforementioned functionality to thereby further make the return process more convenient to the return shipper.

Return shipment functionality provided according to embodiments of the invention may make the foregoing generation of shipping labels and/or postage indicia available to the return shipper, whereby the return shipper makes payment for any fees involved, or some portion thereof (e.g., by direct credit card or automatic check conversion, such as using an automated clearing house (ACH) transaction). However, embodiments of the invention provide for some or all such fees (e.g., the shipping service provider fees, such as return postage) for such return shipping by a return shipper may be borne by the merchant (now the return recipient) according to embodiments herein. For example, a shipping management system may be adapted to allow the return shipper of a return authorized by the return recipient to generate a shipping label on behalf of the return recipient (e.g., utilizing a prepaid postage account of the merchant/return recipient), thereby providing practicable free return shipping from the purchaser/return shipper's point of view. Such operation allows even a small merchant to provide services competitive with much larger merchants in a way which is manageable and does not require generation of large amounts of unused postage.

The return shipping management provided according to embodiments of the invention is not limited to the aforementioned exemplary return shipping request management and return shipping approval management. For example, return shipping management functionality for managing returns may provide monitoring of postage indicia or shipping labels generated by a return shipper using the merchant/return recipient's account to confirm that the postage is actually utilized. If it is determined that the postage for return shipping has not been utilized, such as within some return shipping window of time, a shipping management system adapted according to embodiments of the invention may initiate refund processing to allow the merchant/return recipient to recover the otherwise unused postage value. Additionally or alternatively, embodiments may provide reporting to the merchant/return recipient, such as to allow the merchant to monitor the extent of return shipping postage value authorized and/or actually generated, to monitor use/lack of use of generated return postage, to monitor the items designated for return, to track return shipments while in route by the shipping service providers, to monitor receipt of return items, etc., and/or to analyze data associated with any or all of the foregoing to provide robust reporting and analysis with respect thereto.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
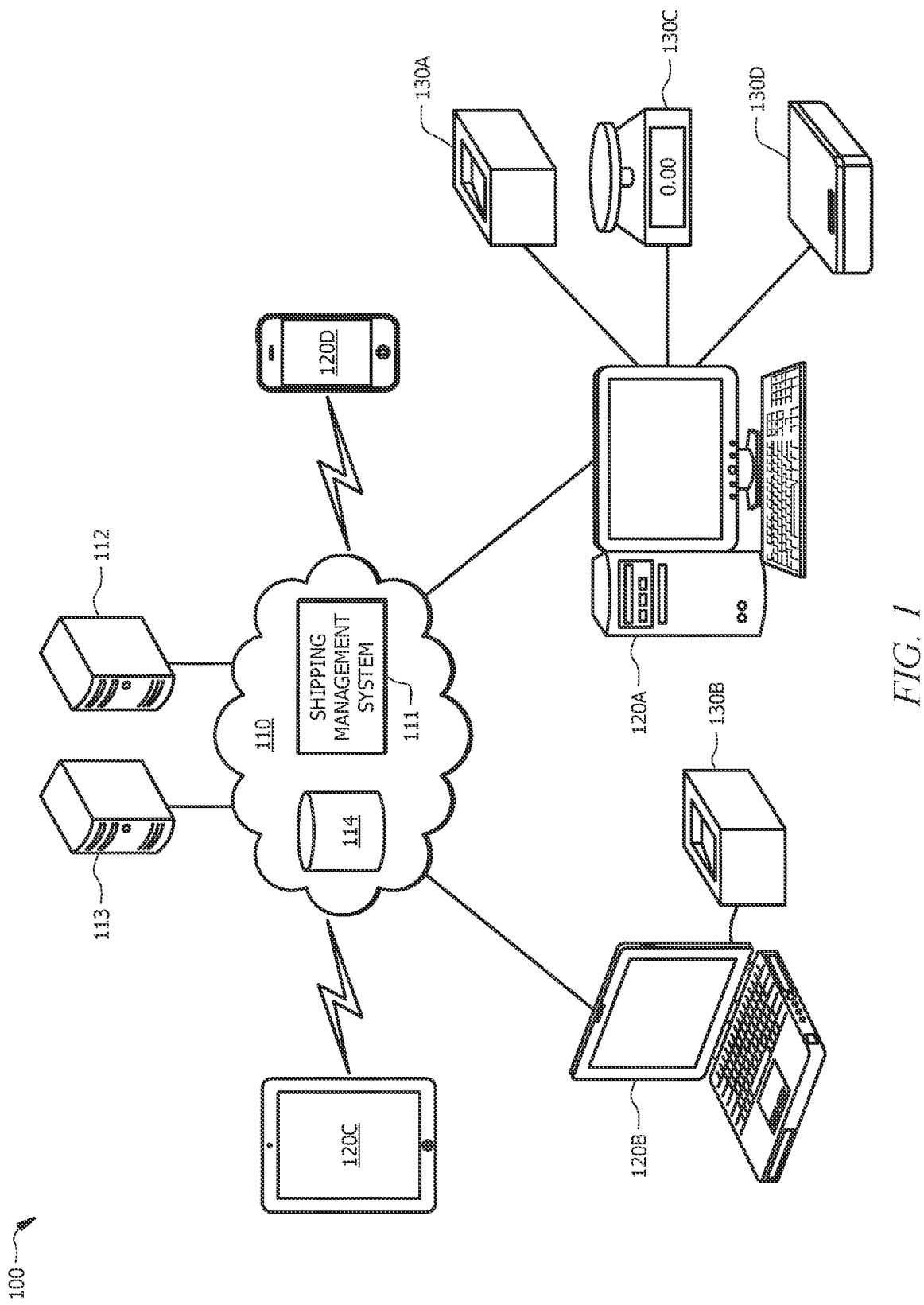
FIG. 1 shows a high level block diagram of a system adapted according to concepts of the present invention.

FIG. 1 shows an embodiment of a system (system 100) adapted to facilitate return shipment of items, such as to provide for the return of goods from a purchaser to a merchant, according to concepts of the present invention. Shipping management system 111 of system 100 may be operable to provide various functionality associated with the processing and shipment of various items. Shipping management system 111 of embodiments may, for example, provide functionality for the processing and shipment of various items by a merchant or other shipper to a purchaser or other recipient as well as for the processing and return shipment of such items by the purchaser or other recipient to the merchant or other original shipper. Such functionality provided according to embodiments of shipping management system 111 includes functionality for managing return requests, processing of return requests, authorizing returns, tracking of the processing of a return request, tracking of return shipments, generating return shipping labels, generating return postage indicia, and/or the like. Additionally, embodiments of shipping management system 111 may provide functionality for the automation of tasks associated with the shipment of items, including the management of item orders, managing the picking and packing of items for order fulfilment, generation of invoices, packing slips, manifests, shipping labels, and postage or other prepaid shipping indicia, and/or tracking of shipment of items through a shipping service provider. For example, shipping management system 111 may comprise some or all of the functionality of a shipping management system, such as the SHIPSTATION shipping management system provided by Auctane LLC of Austin Tex., adapted to further provide for the return shipment of items according to the concepts herein. In particular, embodiments of shipping management system 111 provide a multi-carrier shipping management system capable of providing shipping functionality (e.g., rating, shipping indicia generation, packing list printing, shipping label printing, tracking, carrier pickup request, manifest printing, account management and payment, etc.) for a plurality of shipping service providers (e.g., the United States Postal Service (USPS), United Parcel Service (UPS), Federal Express, DHL, local couriers, etc.).

The illustrated embodiment shows a cloud-based implementation of shipping management system 111. For example, shipping management system 111 may comprise a cloud-based deployment of a multiuser application which is stored and executed by computing equipment disposed in the "cloud" of network 110. Accordingly, system 100 of the illustrated embodiment includes network 110 in which shipping management system 111 is present. Shipping management system 111 may, for example, comprise a system providing various desired functionality such as in the form of software as a service (SaaS), infrastructure as a service (IaaS), platform as a service (PaaS), unified communications as a service (UCaaS), etc.

It should be appreciated that although a cloud-based application environment is shown in the embodiment of FIG. 1, embodiments of the present invention may be implemented using additional or alternative configurations, such as using one or more locally disposed applications, using a distributed application topology, etc. Similarly, it should be appreciated that the "cloud" environment associated with network 110 may comprise applications, systems (e.g., postage system 112, shipping service provider system 113), devices, etc. (e.g., storage 114) in addition to shipping management system 111, one or more of which may be utilized by or otherwise operable with shipping management system 111 for providing functionality as described herein.

Shipping management system 111 may comprise computer executable code executing on one or more processor-based systems (e.g., web servers) deployed in network 110. Network 110 of the illustrated embodiment provides communication links facilitating the communication between various systems and components of system 100, such as user devices 120A-120D and shipping management system 111. Accordingly, network 110 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like. The communication links between the user devices and the other nodes of system 100 (e.g., shipping management system 111, postage system 112, shipping service provider system 113, computing resources 130A-130D, and other ones of user devices 120A-120D) may comprise wired links (e.g., as illustrated for user devices 120A and 120B) or wireless links (e.g., as illustrated for user devices 120C and 120D), as well as combinations thereof. One or more interfaces, such as may comprise appropriate application programming interfaces (APIs), may be included in or otherwise provided with respect to shipping management system 111 to provide data exchange and/or other functionality described herein between shipping management system 111 and other applications, systems, devices, etc. of system 100 (e.g., postage system 112, shipping service provider system 113, and/or user devices 120A-120D).

Postage system 112 may comprise one or more processor-based systems (e.g., web servers) operable to provide prepaid postage account and postage indicia generation services (e.g., to generate postage indicia, shipping labels, etc. acceptable by the USPS and/or other shipping service providers). For example, postage system 112 may comprise one or more server of the online postage service offered by Stamps.com Inc. Various individuals (shippers, purchasers, etc.) and/or other entities (e.g., business entities, merchants, etc.) may maintain an account with respect to postage system 112 facilitating the generation of postage indicia, whether individually, in batch, in combination with other documentation (e.g., shipping labels, bills of lading, manifests, customs documents, etc.), and whether directly by the account holder or indirectly, such by operation of shipping management system 111. Prepaid value associated with such accounts may be stored by, or in association with, postage system 112, such as within a postage security device (PSD). Additional or alternative information may be stored by, or in association with, postage system 112, such as user credentials utilized in validating users for account access, usage logs for accounting and/or fraud prevention/detection, rating information for use in shipping service rate determinations, etc.

Shipping service provider system 113 may comprise one or more processor-based systems (e.g., web servers) operable to provide functionality with respect to shipping services provided by a shipping service provider. For example, shipping service provider system 113 may comprise one or more server associated with the USPS providing an interface for accessing tracking data with respect to shipments made via USPS provided shipping services. Accordingly, various individuals (shippers, intended recipients, etc.) and/or other entities (e.g., businesses, merchants, etc.) may utilize tracking numbers and/or other information to access shipment tracking information throughout the shipment of items by the shipping service provider.

Functionality in addition to or in the alternative to the aforementioned postage generation services provided by postage system 112 and the aforementioned shipment tracking services provided by shipping service provider system 113 may be provided by these and/or one or more other systems of system 100 (not shown), according to embodiments. For example, functionality may be provided by one or more servers (e.g., manufacturers' systems, distributors' systems, product database systems, etc.) to provide information relevant to shipping various items (e.g., weight information used to determine shipping service rates, item content information used to determine shipping services available for use with respect to particular items, such as in the case of hazardous materials, package size information used to determine shipping service rates and/or compatibility with respect to particular items, etc.). It should be appreciated that the functionality provided by various servers and/or other systems of the cloud environment of system 100 of embodiments is not limited functionality directly related to the management of the shipment of items. For example, one or more servers may be present in the cloud environment which are operable to provide online ecommerce sites (e.g., online merchant stores), electronic marketplaces (e.g., eBay and Amazon Marketplace), etc.

Storage 114 shown in the illustrated embodiment disposed in the cloud environment of network 110 may, for example, comprise various forms of tangible, non-transitory computer readable media. For example, storage 114 of embodiments may comprise random access memory (RAM), read only memory (ROM), flash memory, disk memory, magnetic memory, optical memory, etc. Storage 114 may comprise a storage array or other storage system, such as a redundant array of independent disks (RAID) array, a storage area network (SAN), a network attached storage (NAS) array, and/or the like. Such computer readable storage may be utilized to store various information, including program code of shipping management system 111, program code of client applications utilized with respect to shipping management system 111, postage system 112, and/or shipping service provider system 113, data utilized by and/or with any or all of shipping management system 111, postage system 112, shipping service provider 113, and their client applications, etc. Portions of storage 114 may comprise a part of one or more systems of the cloud (e.g., shipping management system 111, postage system 112, and/or shipping service provider system 113) and/or may be separate from such systems (e.g., provided as an independent database system).

User devices 120A-120D of embodiments comprise processor-based systems operable under control of one or more instruction set (e.g., software, firmware, applet, etc.) adapted to cooperate with shipping management system 111 to provide desired functionality, such as the aforementioned exemplary shipping management functionality. For example, user devices 120A-120D may comprise servers and/or terminals in the form of one or more computer, workstation, kiosk terminal, portable processor-based device, personal digital assistant (PDA), smartphone, etc. Such processor-based systems may comprise a central processing unit (CPU) (e.g., a processor from the PENTIUM or CORE line of processors available from Intel Corporation), memory (e.g., RAM, ROM, flash memory, disk memory, optical memory, etc.) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.). It should be appreciated that, although the illustrated embodiment shows a representative example of the number and configuration of user devices as may be utilized with respect to system 100, the concepts of the present invention are not limited to application to the particular number or configuration of user devices shown.

User devices 120A and 120B of the illustrated embodiment comprise computer systems having a processor, memory, and input/output to enable interaction with shipping management system 111 for providing at least some portion of functionality available through operation of system 100. User device 120A may, for example, be configured for use by a merchant or other shipper to operate with an electronic commerce or marketplace system of the cloud environment to offer items for sale and/or with shipping management system 111 for managing orders of such items, outbound shipments of the items of such orders, and return of items by purchasers or other recipients thereof. Accordingly, the illustrated embodiment of user device 120A includes a number of computing resources 130A, 130C, and 130D, as may be utilized in facilitating such functionality. Correspondingly, user device 120B may, for example, be configured for use by a purchaser or other acquirer/recipient of an item to operate with an electronic commerce or marketplace system of the cloud environment to purchase items and/or with shipping management system 111 for requesting and processing return shipment of various purchased or otherwise acquired items. Accordingly, the illustrated embodiment of user device 120B includes computing resource 130B, as may be utilized in facilitating such functionality. As will be appreciated from the discussion which follows, the return shipment of items is facilitated according to embodiments to be convenient to the return shipper, preferably utilizing information already available in or to shipping management system 111, thereby accommodating utilization of less computing resources (e.g., without a scanner, scale, etc.) by a return shipper user device. Of course, such user devices may comprise or otherwise be in communication with any number of computing resources, as may or may not be utilized through operation of various embodiments herein.

Consistent with the foregoing, user device 120C of the illustrated embodiment comprises a tablet device having a processor, memory, and input/output to enable interaction with an electronic commerce or marketplace system of the cloud environment and/or shipping management system 111 for providing at least some portion of functionality available through operation of system 100. User device 120D of the illustrated embodiment comprises a smartphone having a processor, memory, and input/output to enable interaction with an electronic commerce or marketplace system of the cloud environment and/or shipping management system 111 for providing at least some portion of functionality available through operation of system 100. Such user device configurations may be particularly well suited for use by purchasers or other recipients of items herein. Of course, such user devices may be utilized by a merchant or other shipper to provide some functionality as described herein.

Irrespective of the particular configuration of the user device utilized, access to functionality of shipping management system 111 by an item recipient facilitated through operation of user devices in accordance with embodiments herein provides convenience and a higher level of user satisfaction in association with transactions involving the respective merchants. In particular, operation in accordance with embodiments of the invention enables the recipient to perform functions that the recipient otherwise does not possess the infrastructure to do, utilize information regarding the item and/or order available to the shipping management system which the recipient would otherwise be required to obtain and/or input to implement the operations, etc.

User devices 120 (e.g., user devices 120A-120D) of system 100 of embodiments comprise one or more client applications, such as for interacting with shipping management system 111 to provide operation as described herein. For example, user devices 120 may comprise a user interface client application operable to facilitate user interaction with shipping management system 111. Such user interface client applications may comprise a web browser (e.g., INTERNET EXPLORER™, GOOGLE CHROME™, or FIREFOX™)

hosting a client applet associated with shipping management system 111 and operable within the web browser. Thus, a user may interact with shipping management system 111 via a client applet executing within a user interface client application. Additionally or alternatively, user devices 120 may comprise one or more other applications for facilitating operation as described herein. For example, user devices 120 may comprise a mail client (e.g., OUTLOOK™, POSTBOX™, etc.), a short message service (SMS) client, a social media client (e.g., FACEBOOK™ TWITTER™, etc.), and/or the like for receiving messages relevant to operations herein. For example, messages delivered using such client applications may comprise shipment notifications, return authorizations, tracking status reports, etc. The messages may include active components operable to cause the user device to interact with functionality of other systems, such as shipping management system 111, such as to request tracking information, request return authorization, generate and print return shipping labels, etc., as discussed in further detail below.

As illustrated with respect to user devices 120A and 120B, various peripherals and other computing resources useful in providing functionality available through operation of system 100 may be coupled to or otherwise in communication with user devices, or other nodes of system 100, of embodiments. For example, computing resources, such as one or more printer (e.g., thermal printer, ink printer, laser printer, etc.), imaging device (e.g., optical scanner, barcode scanner, handheld scanner, camera, biometric sample scanner, etc.), scale (e.g., electronic scale, digital scale), memory device (e.g., optical disk drive, hard disk drive, solid state disk drive, etc.), and/or the like, may be provided for use with any or all of the foregoing processor-based systems according to embodiments herein. Computing resources 130A and 130B, shown in the illustrated embodiment as printers (e.g., printer for printing proof of payment indicia, bills of lading, manifests, receipts, shipping labels, etc.) are shown as being coupled to user devices 120A and 120B, respectively. Similarly, computing resource 130C, shown as a scale (e.g., an electronic scale for weighing items for shipping), and computing resource 130D, shown as an imaging device (e.g., a scanner for obtaining images of shipping items, for scanning barcodes, for scanning addresses or other shipping item information, etc.), are shown as being coupled to user device 120A of the illustrated embodiment. Of course, configurations and deployments of computing resources different than that shown may be utilized according to embodiments of the invention.

Figure 2:
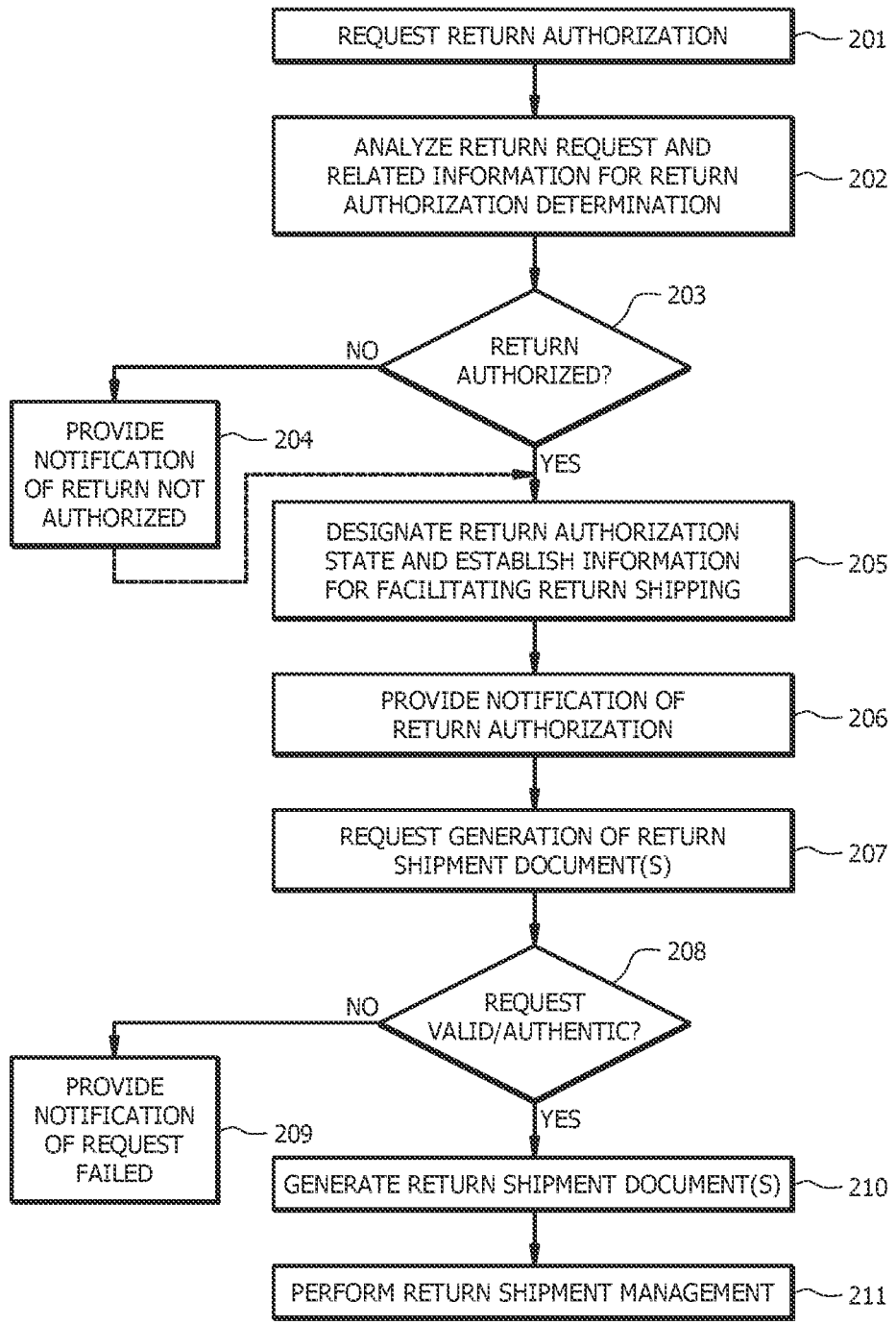
FIG. 2 shows a high level flow diagram of operation of a shipping management system adapted according to concepts of the present invention.

Operation according to embodiments of shipping management system 111 to allow a merchant, or their agent, or other original shipper of items to provide for return shipping of such items by purchasers or other recipients of the items, as well as to provide management functionality with respect to return shipments, is shown in flow 200 of FIG. 2. It should be appreciated that various functionality described below with respect to the exemplary embodiment of flow 200 may be provided alone or in different combinations according to alternative embodiments of the invention. Moreover, such functionality may be provided in accordance with the concepts of the present invention by other means that the illustrative shipping management system described herein.

At block 201 of the illustrated embodiment of flow 200, a request for return authorization is made. It should be appreciated that such a request may be made by a purchaser or other recipient of an item, such as where the item is defective, does not meet the recipient's expectations, or the recipient is merely availing themselves of a merchant's liberal return policy. Such a request for return authorization may be ad hoc, on an order by order or item by item basis. Additionally or alternatively, requests for return authorization may be done in batch or otherwise grouped. For example, a recipient may request return authorization for items from several different orders, from several different merchants, etc. Additionally or alternatively, a request for return authorization as provided at block 201 of embodiments may not comprise a "request" from a purchaser or other recipient of an item, but rather may comprise another form of initiation of processing for return authorization (e.g., automated processing of return authorization for items, purchasers, shipments, etc. meeting criteria for return shipment), as discussed in further detail below.

The return shipment of items to the merchant or other original shipper by a purchaser or other original recipient is facilitated according to embodiments though use of a shipping management system adapted according to embodiments of the invention. Accordingly, shipping management system 111 may provide an interface to return request functionality, allowing a recipient to initiate (e.g., using an appropriate one of user devices 120) the request for return authorization of block 201. In some embodiments, a communication (e.g., an order confirmation, a shipping notice, a customer service communication, etc.) provided by or on behalf of the merchant may include a link (e.g., a uniform resource locator (URL), network address, etc.) which, when selected by a user, causes the user device to interact with the appropriate functionality of shipping management system 111. Embodiments may additionally or alternatively provide for a user independently directly accessing the appropriate functionality of shipping management system 111 for facilitating operations associated with return shipments or otherwise related to items shipped by a corresponding merchant.

A request for return authorization is preferably associated with a particular merchant or other shipper and with an order fulfilled by that merchant or shipper. For example, a return request link provided to the recipient may include unique or substantially unique (e.g., unique in the relevant operation of the shipping management system, although perhaps not unique at large) information from which shipping management system 111 identifies the return request with a particular merchant and/or order, thereby facilitating access to information regarding the item(s) requested to be returned, the time span (order date, delivery date, etc.) the item(s) have/has been out, the purchaser and/or other recipient of the item(s) (possibly including historical information, such as previous purchases and/or returns), the address from which the return is to be made, etc. Where a recipient directly accesses return authorization request functionality of a shipping management system, the recipient may provide information such as order number, merchant identification, purchaser identification, and/or the like to facilitate identification of the merchant and order for which the return is being requested.

It should be appreciated that the requests for return authorization need not be initiated by a purchaser or other recipient, according to embodiments of the invention. For example, a merchant may wish to pre-establish return authorization for some or all items of orders. Accordingly, the request for return authorization of block 201 of embodiments may comprise the merchant or other shipper requesting, or otherwise invoking, analysis for determining whether returns are to be authorized. Such a merchant based return authorization may be processed at various times, such as prior to shipment and/or delivery of the items to the recipient, after shipment and/or delivery of the items to the recipient, in response to the occurrence of an event (e.g., particular interaction with the recipient, upon notification of a manufacturer's recall of an item in the order, etc.). Merchant initiated return authorization may be utilized to provide information regarding the availability of return shipping to the recipient, such as by including a link (e.g., as described above) or other information within an order acknowledgement communication, a shipping notification communication, a shipment tracking information communication, etc., as may be provided to the recipient by the merchant or other shipper of items.

When a request for return authorization has been made, such as utilizing the aforementioned links and/or direct access to the shipping management system by the recipient, the corresponding merchant may elect (whether manually or through application of automated rules) to authorize the return or not. Accordingly, at block 202 of the illustrated embodiment of flow 200, information regarding the return request is analyzed for a determination regarding authorizing the requested return or not. For example, the return request and/or other information (e.g., some or all the order, item, and purchaser information available to shipping management system 111) relevant to or otherwise useful in the return authorization may be analyzed for determining whether or not to authorize the return of the item.

In accordance with embodiments of the invention, the merchant may establish return authorization rules, such as to designate particular purchasers, purchasers meeting predetermined criteria, particular items, particular threshold values of items, particular categories or types of items, items or orders meeting predetermined criteria, particular ecommerce sites or marketplaces through which items are purchased, particular coupon or offer codes used when items are ordered, etc., whereby items or orders may be analyzed to determine if the attributes of one or more such rule are met for automated authorization of returns. A merchant may, for example, create a return authorization rules database in storage 114, whereby information regarding the return request, the item(s) to be returned, the order(s) associated with the item(s), the purchaser or other recipient, etc. are analyzed with respect to the return authorization rules to provide an automated return authorization determination. The items or orders appropriately meeting the attributes of the rule(s) may be identified for being provided return authorization in operation at block 202 of embodiments of the invention.

Although the foregoing exemplary return authorization analysis is described with respect to automated, rules-based authorization, embodiments of the invention may implement additional or alternative means by which to return authorization analysis. For example, merchant personnel may review some or all return requests, orders, items, etc. (e.g., requests falling outside of the rules of a return authorization rules database, requests meeting particular criteria for manual verification of return authorization after application of applicable return authorization rules, where no return authorization rules have been established, etc.) to determine if return authorization is to be provided.

At block 203 of the illustrated embodiment, the results of the analysis performed at block 202 are utilized to determine whether the requested return is authorized or not. The return authorization determination, particularly automated rules-based determinations, may be reviewed or otherwise vetted prior to acting upon the determination at block 203. For example, merchant or other shipper personnel may review some or all automated return authorization determinations to override such determinations (whether authorizing or not authorizing returns) in appropriate situations.

If it is determined that return authorization is not to be provided, processing according to the illustrated embodiment proceeds to block 204, wherein notification of the return not having been authorized is provided. For example, the aforementioned interface provided by embodiments of shipping management system 111 may operate to present such a notification to the requester, such as in real-time in response to the request, during a subsequent session where the requester accesses functionality of shipping management system 111, etc. Additionally or alternatively, such notification may be transmitted to the requester and/or others, such as using email, SMS, social media, etc. The notification may, for example, include information regarding the determination that the item or order is not eligible for return, information regarding why it was determined that a return was not authorized, information regarding alternative actions the requester may take with respect to the requested return (e.g., providing manufacturer contact information for direct return or technical support), etc.

It should be appreciated that denial of return authorization according to embodiments of the invention may not mean that the recipient (putative return shipper) may not return the item, but rather that return shipment will not be free to the recipient (i.e., the merchant or other putative return recipient will not bear the cost of return shipping). Accordingly, the notification provided at block 204 of embodiments may additionally or alternatively include information regarding alternative actions the requester may take with respect to the requested return shipment document generation. For example, the notification of the return not having been authorized may provide manufacturer contact information for returning the item(s) directly to the manufacturer (e.g., rather than returning the item(s) to the merchant), provide information regarding technical support to attempt to resolve the issue prior to authorizing return of the item(s) (e.g., operation of embodiments may fail a return request until records indicate one or more pre-requisite, such as attempting technical support resolution, has been attempted), provide information facilitating the return of the item(s) at the recipient's expense (e.g., provide return shipment address and/or a return materials authorization (RMA) number where the return of the item(s) is permitted, although return postage is not to be borne by the merchant), etc. Where such return of item(s) is permitted, although the merchant has not authorized postage and/or other costs at their expense, processing according to some embodiments may proceed from block 204 to block 205 to facilitate return shipping, albeit at the return shipper's expense. For example, operation may be performed with respect to such return shipments as set forth below, except that generation of shipping documents having prepaid postage or otherwise imposing return shipping expenses upon the merchant (putative return recipient) is omitted/prevented.

If, however, it is determined that return authorization is to be provided, processing according to the illustrated embodiment proceeds to block 205, wherein further processing with respect to the requested return is performed. For example, embodiments of the invention operate not only to provide management with respect to return authorization requests, but additionally or alternatively provide operation to facilitate the return shipment of the item(s) to be returned. The further processing provided according to embodiments may operate to facilitate such return shipment. It should be appreciated that approval of return authorization according to embodiments provides for the return shipment being free to the recipient, or at least the full cost is not borne by the recipient or other putative return shipper, (e.g., the merchant or other putative return recipient will bear the cost of return shipping).

The return authorization request management functionality of shipping management system 111 may provide operation to aid in timely return authorization determinations. For example, logic of shipping management system 111 may operate to track return requests from their initiation by the respective recipients through approval or denial by the respective merchants, such as to ensure all requests are acted upon. Embodiments may operate to provide reminder messages, status update information, etc. to either or both merchant/shipper personnel and the requester.

It should be appreciated that operation to determine whether returns are to be authorized, whether for an order, item, purchaser, etc., (e.g., processes of blocks 201, 202, and/or 203) may be made at various times. For example, a return authorization determination may be made after delivery of a shipped item to a recipient, such as in response to an ad hoc return authorization request by the recipient. Additionally or alternatively, a return authorization determination may be made prior to a return request being made by a recipient, such as prior to the ordering of items by the purchaser, at the time or ordering items by the purchaser, at the time of fulfillment or shipment of the order or its individual items, and combinations thereof. Such pre-establishment of return authorization may be useful in providing advance notification of the availability of returns being facilitated according to embodiments of the invention, such as to promote this feature in a listing of terms for corresponding items in an electronic marketplace or electronic commerce site and/or to provide notification to a purchaser early in the transaction (e.g., in an order conformation communication, a shipping notice communication, etc.).

At block 205 of the illustrated embodiment, a return authorization state designation is provided with respect to an order, or one or more items thereof, associated with the request for which return authorization has been granted. For example, an order record of a merchant order database (e.g., stored in storage 114) may be updated to indicate that particular items and/or orders have been authorized for return. Such information may be utilized, for example, in generating reports regarding outstanding return merchandise for a merchant, tracking the status of returns, verifying or validating subsequent requests related to the return (e.g., a request for return shipment documents, as discussed below), and/or the like.

Additionally or alternatively, information for facilitating return shipping of the items for which return authorization has been granted is established in operation at block 205 of embodiments. For example, rate ingredients (i.e., information from which a return shipping rate, such as USPS postage rates, is determined) for the authorized return may be established. Such rate ingredients may include information available to or stored by shipping management system 111 (e.g., in an order database of storage 114), such as the weight of items being returned, the address of the return shipper (e.g., the address to which the item was originally shipped by the merchant), shipping media information (e.g., size, weight, measurements, etc. of reusable shipping media used to originally ship the item(s) to the recipient), etc. The rate ingredients may additionally or alternatively include information which is not part of the original order information. For example, the rate ingredients may include information regarding the particular item(s) being returned (e.g., a subset of the items of the original order), such as may be provided in the return authorization request. Likewise, the rate ingredients may include information regarding the particular shipping service to be utilized with respect to the return shipment, as may be provided or selected by the merchant or other shipper of the order. For example, although an order may have originally been shipped to a recipient using a first shipping service (e.g., an expedited shipping service, such as Express Mail or overnight service), the return shipment may be provided utilizing a second shipping service (e.g., an economy shipping service, such as parcel post or ground service), such as to reduce return shipping costs where completing the return to the return recipient (e.g., merchant or other original shipper) is not time critical. Similarly, although an order may have originally been shipped to the recipient using a first shipping service provider (e.g., FedEx or USPS), the return shipment may be provided utilizing a second shipping service provider (e.g., USPS, FedEx, or UPS), such as to facilitate return shipment by the return shipper (e.g., purchaser or original recipient).

Information for facilitating return shipping of items is not limited to the aforementioned rate ingredients. Embodiments of the invention may additionally or alternatively operate to establish information (e.g., a unique or substantially unique return identifier, RMA number, etc.) for identifying the return authorization (e.g., return identification information), such as for use in identify and/or manage the particular return items, providing a link to rate ingredients and/or other information for the return, etc. Likewise, embodiments of the invention may operate to establish information regarding an expiration of the return authorization (e.g., return expiration information). For example, although requesting a return authorization, individuals will sometimes nevertheless decide not to return the item(s). Accordingly, an expiration time or window in which the return authorization is valid may be established. Establishing such a return authorization expiration may be particularly useful in preventing or eliminating stale returns and/or managing return shipping value indicia (e.g., pre-paid postage indicia generated for return shipping, as discussed below).

Processing for securing and/or facilitating validating subsequent utilization of a return authorization, and/or information for facilitating return shipping of items associated therewith, may be provided according to embodiments of the invention. For example, substantially unique return identifier information or other return identification information (i.e., information utilized to identify the return authorization to shipping management system 111) may be digitally signed, uniquely or substantially uniquely tied to the requester, requester's user device, etc., for providing security, validation, and/or authentication. The result of such processing may be passed to the requester in the form of a digital token (referred to herein as a return shipment authorization token), such as may be provided as or with the aforementioned return identification information and as may later be used with respect to generating return shipment documents herein.

Any or all of the foregoing information may be stored for use with respect to the return shipment of items. For example, shipping management system 111 may operate to store the foregoing information in storage 114, such as in a return authorization database having records indexed to or otherwise related to respective orders of one or more merchant order database (e.g., as may also be stored in storage 114).

At block 206 of the illustrated embodiment, notification of the return having been authorized is provided. For example, the aforementioned interface provided by embodiments of shipping management system 111 may operate to present such a notification to the requester, such as in real-time in response to the request, during a subsequent session where the requester accesses functionality of shipping management system 111, etc. Additionally or alternatively, such notification may be transmitted to the requester and/or others, such as using email, SMS, social media, etc. The notification may, for example, include information regarding the determination that the item or order is eligible for return, information useful in facilitating the return shipping of the item(s) (e.g., substantially unique return identifier), etc. For example, the notification and/or other communication associated therewith may include a link or other active element (e.g., software "button") operable to initiate functionality of shipping service provider system 111, postage system 112, etc. for facilitating return shipping.

Notification regarding the return authorization provided according to embodiments of the invention is not limited to initial notification of the authorization determination. One or more notification or other communication regarding the return authorization may be provided, for example, to aid in timely return of authorized items. For example, logic of shipping management system 111 may operate to track return authorizations their initial determination through shipment of return items by a return shipper (e.g., purchaser or other original recipient), such as to ensure all return authorizations are acted upon. Embodiments may operate to provide reminder messages, status update information, etc. to either or both merchant/shipper personnel and the requester/return shipper.

At block 207 of the illustrated embodiment of flow 200, a request for generation of one or more documents used with respect to the authorized return is made. A request for generation of documents of embodiments may, for example, be made by a purchaser or other recipient of an item (now the return shipper) preparing to initiate a return shipment. The request may include information for identifying the particular order under which an item for return was provided, the particular return sender, the merchant to which the return is to be made, identifying the return authorization (e.g., substantially unique return identifier), etc., for facilitating processing of the request and/or for identifying information to be utilized in generation of the return shipment documents. Such return shipment document(s) may comprise various forms of documents and/or other data compilations useful in providing return shipment of items. Return shipment documents generated according to embodiments may, for example, comprise shipping labels, postage indicia (or other proof of payment for shipping services), way bills, bills of lading, manifests, packing slips, RMA labels, customs forms, etc.

For example, embodiments operate to enable the recipient (now return shipper) to generate a shipping label, having prepaid postage indicia thereon, and/or other documentation related to the return shipment. Accounts maintained with respect to postage system 112 by various individuals (shippers, purchasers, etc.) and/or other entities (e.g., business entities, merchants, etc.) may be utilized to facilitate such generation of postage indicia, whether individually, in batch, in combination with other documentation (e.g., shipping labels, bills of lading, manifests, customs documents, etc.), whether directly by the account holder or indirectly, by operation of shipping management system 111 of embodiments. Additional information (e.g., user credentials) stored by, or in association with, shipping management system 111 and/or postage system 112, may be utilized in facilitating the generation of postage indicia and/or other return shipment documents (e.g., the return shipper may generate postage on the merchant's postage or other shipping account without being authenticated to that account).

In operation according to embodiments, the return shipper is enabled to perform functions that this individual does not otherwise possess the infrastructure to do, to utilize information regarding the item and/or order available to the shipping management system (e.g., the aforementioned rate ingredients) which the recipient would otherwise be required to obtain and/or input to implement the operations, generate postage indicia on behalf of a corresponding merchant or other original shipper, etc. In particular, the return shipper may be enabled to access appropriate information (e.g., data associated with the return shipper's original order) of the merchant within shipping management system 111, utilize a postage account or other shipping account of the merchant (e.g., invoke functionality of postage system 112 on behalf of the merchant), and/or the like. Accordingly, the return shipment document generation request may be validated or authenticated, such as through processing at block 208 of the illustrated embodiment.

Return shipment document generation request validation and/or authentication as provided at block 208 of the illustrated embodiment may comprise analyzing information included in the request itself, analyzing information stored by or in association with shipping management system 111, analyzing information stored in association with the requester (e.g., purchaser or original recipient of the items), etc. For example, a return shipment document generation request may include a substantially unique return identifier, information for facilitating return shipping of items associated therewith, a return shipment authorization token, and/or other information useful in validating, authenticating, or otherwise processing the request.

If it is determined that the return shipment document generation request is not valid, authentic, or is otherwise not to be granted (e.g., the recipient and/or associated order are not authorized to make a return, generation of return postage for the authorization has already been performed, etc.), processing according to the illustrated embodiment proceeds to block 209, wherein notification of the return shipment document generation request not having been granted is provided. For example, the aforementioned interface provided by embodiments of shipping management system 111 may operate to present such a notification to the requester, such as in real-time in response to the request. Additionally or alternatively, such notification may be transmitted to the requester and/or others, such as using email, SMS, social media, etc. The notification may, for example, include information regarding the determination that the request is not valid, authentic, grantable, etc. For example, where facilitating return shipping as provided by embodiments comprises allowing a return shipper to generate postage indicia (e.g., a prepaid USPS return shipping label) on behalf of a merchant or other original shipper (e.g., to provide free return shipping to purchasers), the return authorization may be determined to no longer be valid where the postage indicia for the return has already been generated (e.g., the recipient/return shipper has already accessed the system and generated return postage). In such a situation, the notification provided at block 209 may provide information explaining that the return postage has been previously generated, and preferably operates to prevent generation of additional return postage which would presumably result in one or more of the generated return postages going unused or fraudulently used.

The notification provided at block 209 of embodiments may additionally or alternatively include information regarding alternative actions the requester may take with respect to the requested return shipment document generation. For example, the notification of a failed request may provide information regarding technical support to attempt to resolve the issue prior to validating the request to generate shipment documents (e.g., operation of embodiments may fail a shipping document generation request until records indicate one or more pre-requisite, such as attempting technical support resolution, has been completed), etc. Where facilitating return shipping as provided by embodiments comprises allowing a return shipper to generate postage indicia on behalf of a merchant or other original shipper, the notification may include information (e.g., a URL or other link, instructions, etc.) for facilitating the reprinting of the previously generated postage indicia (e.g., to accommodate a printer error, etc.). Additionally or alternatively, such a notification may include information (e.g., a URL or other link, instructions, etc.) for facilitating cancelling the previously generated postage indicia, and possibly for facilitating the regeneration of postage indicia (e.g., to provide for correcting one or more aspect thereof, etc.).

If, however, it is determined at block 208 that the return shipment document generation request is valid and/or authentic and is to be granted (e.g., the recipient and/or associated order are authorized to make a return, generation of return postage for the authorization has not already been performed, etc.), processing according to the illustrated embodiment proceeds to block 210, wherein one or more return shipment documents are generated. For example, the aforementioned interface provided by embodiments of shipping management system 111 may operate to provide access to functionality for the generation of return shipping labels, the generation of postage indicia (or other proof of payment for return shipping services), etc. for use with respect to the authorized return shipments. Accordingly, functionality which may not otherwise be readily available to the return shipper may be made accessible for use by the return shipper through shipping management system 111 of embodiments. Additionally or alternatively, information utilized with respect to the return shipment (e.g., the particulars of the item being returned, such as weight), which are available in or to shipping management system 111, may be utilized by the aforementioned functionality to thereby further make the return process more convenient to the return shipper.

In operation according to embodiments, generation of return shipping documents by shipping management system 111 provides for the generation of prepaid postage indicia (e.g., whether as individual postage indicia, shipping labels including postage indicia, etc.) by a return shipper. For example, shipping management system 111 may interface with one or more other systems, such as postage system 112, operable to perform or otherwise facilitate prepaid postage generation. In accordance with embodiments, postage system 112 is operable to provide prepaid postage account and postage indicia generation services (e.g., to generate postage indicia, shipping labels, etc. acceptable by the USPS and/or other shipping service providers). Credentials for accessing a particular account and generating postage indicia therefrom may be provided by or through shipping management system 111 to postage system 112.

Embodiments of the invention provide for some or all fees (e.g., the shipping service provider fees, such as return postage) for such return shipping by a return shipper to be borne by the merchant (now the return recipient). For example, shipping management system 111 may be adapted to allow the return shipper of a return authorized by the return recipient to generate a shipping label on behalf of the return recipient (e.g., utilizing a prepaid postage account of the merchant/return recipient), thereby providing practicable free return shipping from the purchaser/return shipper's point of view. Such operation allows even a small merchant to provide services competitive with much larger merchants in a way which is manageable and does not require generation of large amounts of unused postage.

In operation according to embodiments, where a return shipper is authorized to generate return postage indicia at the merchant's (return recipient) expense, shipping management system 111 may store and pass appropriate credentials for the merchant's postage account to postage system 112 without ever exposing those credentials to the return shipper. Moreover, through the validation/authentication processing provided according to embodiments, the return shipper is prevented from improperly accessing, or otherwise abusing access to, the merchant's postage account. For example, the aforementioned return shipment token may not only be used to validate the return shipper as having been authorized for the return shipment, but may also be utilized to identify the request for generation of return shipping documents to the particular merchant's (now return recipient) records including prepaid postage account credentials.

Using the merchant's prepaid postage account credentials, perhaps with appropriate information regarding the return shipment (e.g., as may be provided using order information available to shipping management system 111), postage system 112 may operate to generate postage indicia (e.g., alone or with/within other documentation, such as a shipping label) and provide the generated return shipping document(s) to shipping management system 111 for use by/with respect to the return shipper. Some or all of the information regarding the return shipment may be provided as part of the aforementioned rate ingredients (i.e., information from which a return shipping rate is determined), such as may comprise the weight of items being returned, the address of the return shipper, shipping media information, information regarding the particular item(s) being returned, information regarding the particular shipping service to be utilized with respect to the return shipment, etc.

It should be appreciated that the aforementioned operation according to embodiments operates to decouple generation or establishing of some or all of the rate ingredients from which postage rates are determined and the actual generation of the postage for which the rates apply. For example, embodiments where the merchant provides for authorization of return shipping at or near the time of the original shipment to the original recipient (such as to include information regarding return shipping in the shipping notification and/or tracking information communications), the compiling of rate ingredients for at least initially establishing or predicting a rate or the merchant's obligation for the return shipping may be performed days, weeks, or even months before the actual shipping documents (e.g., as may include prepaid postage indicia) are generated. Even where the return shipping authorization is provided in response to an ad hoc request for return by the recipient, the generation of rate ingredients may be decoupled from the generation of the corresponding shipping documents by a matter of days or even weeks.

Such decoupling of establishing rate ingredients from the generation of the shipping documents may introduce challenges with respect to the generation of appropriate prepaid postage indicia. For example, this decoupling according to some embodiments may result in separate persons or other entities (e.g., merchant and recipient) each performing a portion of the operations typically performed by a single person or entity for processing a shipment. The interests, skill levels, etc. of the separate persons or entities involved in a particular return shipping transaction may not be aligned or otherwise inconsistent, possibly leading to or allowing undesired results. Thus, in operation according to embodiments, the rate ingredients, or some portion thereof, may be established by and/or rendered fixed (e.g., stored in a database of storage 114 as unchangeable to the return shipper) by the merchant (now return recipient), such as prevent the return shipper from making changes (e.g., selecting a particular shipping services, entering an erroneously high shipping weight for the item, selecting a shipping service provider having higher fees for the needed shipping service, etc.) which undesirably increase the merchant's costs for the return shipment. Additionally or alternatively, the fixing of the rate ingredients, or some portion thereof, may be utilized to prevent a putative return shipper from misusing the return shipping authorization to instead prepare shipping documents for shipping items to someone other than the merchant or their designees. Accordingly, although in the decoupled return postage operation of embodiments empowers a return shipper to generate prepaid postage shipping documents utilizing an account of the merchant (now return recipient), rate ingredients utilized in the generation of such shipping documents (e.g., as may be accessed via shipping management system 111) may nevertheless be established by and protected for the merchant. Thus, the merchant is able to offer free return shipping from the vantage point of a purchaser (now return shipper) with little or no risk that the return shipping documents will be inappropriately generated or improperly used.

The availability of or amount of account balances maintained by or on behalf of a merchant is a further example of challenges which may be introduced in light of decoupling of establishing rate ingredients from the generation of the shipping documents according to some embodiments. For example, when establishing rate ingredients for a particular return shipment, and authorizing the return shipment having a particular shipping service provider fee to be incurred by the merchant for the return shipment, the then-current state of the merchant's postage or other account may be such that the return shipping may be accommodated. For example, a prepaid account balance (e.g., a USPS prepaid postage meter account) may have sufficient prepaid funds to facilitate generation of postage indicia for the return shipment in accordance with the rate ingredients. Similarly, a postpaid account balance (e.g., a UPS or FedEx merchant account balance) may be sufficiently low so as to accommodate accruing a postpaid fee debit to facilitate generation of postage indicia for the return shipment in accordance with the rate ingredients. For example, the processing provided at block 202 and/or block 205 of embodiments may operate to verify an appropriate account balance of the merchant for the return shipping to be and/or having been authorized. However, as the shipping documents and/or actual shipping services are decoupled from establishing the rate ingredients and authorizing the return shipping, the corresponding account may not be debited until the return sender generates the shipping documents and/or utilizes the return shipping service, according to embodiments. Additionally or alternatively, complications with respect to the rates determined at the different times may be presented, such as due to a change in the rate tables utilized by the shipping service providers, a change in shipping service offerings, etc. Accordingly, embodiments are adapted to accommodate changes in the rates to be incurred for return shipping services and/or the merchants' accounts to be utilized for facilitating the return shipping services. Embodiments of the invention may, for example, operate to determine or re-determine the rate to be incurred by the merchant (now return recipient) at some time after the merchant has authorized the return shipment and implement appropriate action(s).

As an example of adaptation to accommodate changes in the merchants' accounts, when a return shipper is requesting generation of return shipment documents (block 207) and/or generating return shipment documents (block 210), shipping management system 111 may operate to determine the rate for the corresponding shipping services and initiate appropriate action where the determined rate cannot be accommodated by an appropriate merchant shipping service account. For example, if a USPS prepaid postage account does not include sufficient funds to allow generation of prepaid postage indicia for the return shipment, embodiments of the invention may implement an auto refill operation to add prepaid value to the account. In operation according to embodiments, shipping management system 111 may store merchant credentials for interaction with postage system 112 in order to generate postage indicia and other shipping documents for the merchant (e.g., for outbound shipment of items to purchasers), whereby these credentials may be utilized in adding value to one or more of the merchant's prepaid postage accounts in order to facilitate generation of shipping documents for use with respect to authorized return shipment. In particular, in operation according to embodiments, an auto-funding feature may be provided whereby shipping management system 111 will automatically add funds to the merchant's postage meter account when needed to generate postage indicia for an authorized return shipment and/or when a balance of that account falls below a certain threshold (e.g., when a postage meter account balance falls below a predetermined threshold, such as $25.00, a transfer of a pre-established refill amount, such as $100.00, may be initiated, such as using a credit card or automatic check conversion transaction on behalf of the merchant).

Embodiments may alternatively be adapted to avoid changes in the merchants' accounts which would prevent or otherwise interfere with the generation of shipping documents by a return shipper for an authorized return shipment. For example, embodiments of the invention may implement a funds reservation technique whereby an amount determined to accommodate the shipping services rate for an authorized return shipment are reserved (e.g., held as not available for use in another shipping transaction) until the corresponding shipping documents are generated, the shipping services are initiated, or the return shipping authorization is expired. Details with respect to account balance reservation techniques as may be implemented in accordance with embodiments of the invention are shown and described in the above referenced patent application entitled "SYSTEMS AND METHODS FOR VALUE BEARING INDICIA BALANCE RESERVATION."

An example of adaptation to accommodate changes in the rates, when a return shipper is requesting generation of return shipment documents (block 207) and/or generating return shipment documents (block 210), shipping management system 111 may operate to determine the rate for the corresponding shipping services and initiate appropriate action where the determined rate is not within acceptable bounds. For example, the rate may be re-determined when the return shipper requests generation of return shipment documents (block 207) and the re-determined rate may be compared with a rate determined when the merchant authorized the return shipment (block 202), whereby if the re-determined rate is not the same or differs by more than some threshold amount (e.g., a particular dollar amount established by the merchant, a percentage, such as 10% or 20%, established by the merchant, etc.) the request for generation of return shipment documents may not be validated (block 208). As another example, the rate may initially be determined when the return shipper requests generation of return shipment documents (block 207) and the determined rate may be compared with an expected rate or approved rate authorized by the merchant (e.g., the merchant may establish approved rate ranges, such as may be particular dollar amounts, percentages of item value, etc., for types of items, the individual or types of original recipients, the type of shipping service utilized for the original delivery, etc.), whereby if the determined rate is not within the expected or approved rate range the request for generation of return shipment documents may not be validated (block 208). In such embodiments, further processing may be provided to notify the merchant and allow the merchant to override the validation determination, select a different shipping service to result in the rate meeting the merchant's goals, etc.

It should be appreciated that the generation of return shipment documents according to embodiments of the invention is not limited to postage indicia generated at the expense of a merchant receiving the return shipment. For example, embodiments of shipping management system 111 may be adapted to facilitate the return shipper generating postage indicia at their own expense, or partially at their own expense (e.g., where the merchant only bears a portion of the cost, such as where the return shipper requests added shipping services, upgraded shipping services, etc.), whether or not the return shipper maintains a postage account themselves. For example, shipping management system 111 may enable a return shipper to provide their credentials for their own postage account at postage system 112, whereby those credentials along with appropriate information regarding the return shipment (e.g., as may be provided using order information available to shipping management system 111) may be provided to postage system 112 for generation of appropriate postage indicia at the return shipper's expense. Alternatively, shipping management system 111 may make the foregoing generation of postage indicia available to the return shipper, whereby the return shipper makes payment for any fees involved without the return shipper having a prepaid account for doing so (e.g., by direct credit card or automatic check conversion, such as using an ACH transaction).

The return shipment documents generated by operation at block 210 of embodiments may be provided to the return shipper in a number of ways. For example, embodiments of shipping management system 111 may utilize one or more computing resource local to the return shipper to print one or more return shipping documents (e.g., a local printer such as represented by computing resources 130A and 130B), as may be facilitated according to the techniques shown and described in the above referenced patent application entitled "SYSTEMS AND METHODS FOR CLOUD-BASED APPLICATION ACCESS TO RESOURCES." Additionally or alternatively, embodiments of shipping management system 111 may store generated return shipping documents (e.g., in a database of storage 114) and provide access to such documents to the return shipper (e.g., via a client operable upon a user device, such as any of user devices 120A-120D, utilized by the return shipper), such as using a URL or other link. Providing such storage and controlling access to generated return shipping documents may not only facilitate initial printing of the documents by the return shipper, but may also be utilized for facilitating the controlled reprinting of the previously generated postage indicia (e.g., to accommodate a printer error, etc.).

It should be appreciated that generation of return shipment documents and/or the printing or other utilization of generated return shipment documents may be controlled (e.g., at blocks 207, 208, and/or 210) in accordance with information regarding an expiration of the return authorization (e.g., return expiration information). For example, when determining the validity of a request to generate return shipment documents at block 208 of embodiments, return expiration information for the authorized return shipment may be analyzed to determine if an expiration time or window in which the return authorization is valid has transpired. Additionally or alternatively, when performing operation to generate return shipment documents, to print generated return shipment documents, to reprint generated return shipment documents, etc. at block 210 of embodiments, return expiration information for the authorized return shipment may be analyzed to determine if an expiration time or window in which the return authorization is valid has transpired. Where such return expiration information for the authorized return shipment indicates that an expiration time or window in which the return authorization is valid has transpired, operation according to embodiments may prevent generation, printing, reprinting, or like operations with respect to the return shipment documents. Such operation may halt further processing with respect to the return shipment, or may provide additional processing in order to attempt to resolve the issue, such as to imitate a renewed request for return authorization. For example, where operation to generate return shipment documents at block 210 provides a URL for printing the generated documents (e.g., a shipping label having prepaid postage indicia thereon), instructions provided regarding the use of the URL may indicate that the generated documents are to expire if unused within a certain time (e.g., 7 days after generation, 7 days after authorization of the return shipment by the merchant, etc.), whereby if the return shipper attempts to print or otherwise utilize the return shipment documents (e.g., clicks on the URL) after the expiration date an error message is returned to say the return shipping documents are no longer available.

Although above examples have been described with reference to the return shipment documents being generated in response to a request by the return shipper, it should be appreciated that operation in accordance with the concepts herein is not limited to the particular order of events provided in the foregoing examples. For example, embodiments of the invention may provide for generation of return shipment documents upon authorization of the return shipment by the merchant (e.g., generating a shipping label having prepaid postage indicia at block 205). In such embodiments, the return shipper may be provided access to the generated return shipment documents (e.g., as URLs or other links as may be provided at block 206), whereby the return shipper may thereafter initiate printing or otherwise utilize the return shipping documents (e.g., printing a shipping label for the return shipment at block 210).

It should be appreciated that the return shipping management provided according to embodiments of the invention is not limited to the aforementioned exemplary return shipping request/approval management and return shipping document generation/printing. Return shipping management functionality for managing returns of the embodiment of flow 200 illustrated in FIG. 2 provides monitoring of postage indicia or shipping labels generated by a return shipper at block 211. For example, the return shipment management provided at block 211 of embodiments may provide monitoring with respect to generated postage indicia, or other return shipment documents, to confirm their use by a return shipper. In operation according to embodiments, shipping management system may interact with shipping service provider system 113 to determine if a return shipment document for a particular return has been initially scanned or has otherwise been introduced into the services of the shipping service provider (e.g., introduction into the mail stream), and thus the return shipment document is or has been utilized. If it is determined that the return shipment documents have not been utilized, such as within some return shipping window of time (e.g., return expiration time), shipping management system 111 of embodiments may initiate one or more action, such as to notify the return shipper and/or merchant, cancel any prepaid postage indicia (e.g., perform refund processing to allow the merchant/return recipient to recover the otherwise unused postage value), etc. Additionally or alternatively, such monitoring may be provided by shipping management system 111 of embodiments to enable the merchant to monitor the extent of return shipping postage value authorized and/or actually generated, to monitor the items designated for return, to track return shipments while in route by the shipping service providers, to monitor receipt of return items, etc., and/or to analyze data associated with any or all of the foregoing to provide robust reporting and analysis with respect thereto. Techniques as may be utilized in providing tracking of return shipments in accordance with embodiments of the present invention are shown and described in the above referenced patent application entitled "SYSTEMS AND METHODS IMPLEMENTING AUTOMATED SHIPMENT STATUS TRACKING."

It should be appreciated that various operations of flow 200 may be provided according to embodiments even where a request for return authorization is not authorized and/or where a request for generation of return shipment documents is not validated. As previously mentioned, for example, denial of return authorization according to embodiments of the invention may not mean that the recipient (putative return shipper) may not return the item, but rather that return shipment will not be free to the recipient. Accordingly, various of the above described operations (e.g., the establishing of information for facilitating return shipping at block 205 and generation of return shipment documents at block 210) may nevertheless be performed to facilitate return shipping at the return shipper's expense. Further, operation to enable the merchant to monitor the items designated for return, to track return shipments while in route by the shipping service providers, to monitor receipt of return items, etc., and/or to analyze data associated with any or all of the foregoing to provide robust reporting and analysis with respect thereto (e.g., the return shipment management at block 204) may be performed.

Although embodiments have been described herein with reference to return of items to a merchant or other designated source agent, return shipping facilitated according to embodiments of the invention may provide shipment of items to any number of return recipients. For example, a merchant may provide for return shipping of items directly to a manufacturer, a repair depot, a remanufacturing/refurbishment facility, etc. Likewise, the return shipping may be provided by an entity other than the merchant which originally provided the items to the return shipper. For example, a manufacturer may provide return shipping under their warranty program using the techniques described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of controlling generation of a return shipment document in a shipping management system to prevent a return shipper from improperly generating or improperly using the return shipment document, the method comprising:

establishing, under control of logic of the shipping management system, rate ingredients for subsequent generation of at least one return shipment document for return shipping of an item, wherein the rate ingredients include information regarding physical attributes of the item stored by the shipping management system;

providing, to a user device, a return shipment authorization token uniquely associated with the user device;

receiving, subsequent to the establishing the rate ingredients and providing the return shipment authorization token, a request to generate the at least one return shipment document, wherein the request includes the return shipment authorization token, and wherein the return shipment authorization token is configured to authenticate the request;

determining a rate for the return shipping of the item based at least in part on the rate ingredients;

in response to authenticating the return shipment authorization token included in the request, generating the at least one return shipment document based on the determined rate for the return shipping of the item, wherein the at least one return shipment document is generated using an account of a return recipient to provide the return shipping of the item; and transmitting, to a return shipper client application, instructions to print the at least one return shipment document local, the at least one return shipment document being sufficient to establish proof of payment to a shipping service provider for the return shipping of the item by the return recipient.

2. The method of claim 1, wherein the at least one return shipment document comprises prepaid postage indicia and the return recipient account comprises a prepaid postage meter account.

3. The method of claim 2, wherein the at least one return shipment document comprises a shipping label.

4. The method of claim 3, further comprising utilizing information, stored by the shipping management system, regarding an order for the item by the return shipper to populate at least one field of the shipping label when generating the at least one return shipment document.

5. The method of claim 1, further comprising:
authorizing the return shipping at the return recipient's expense using the rate ingredients.

6. The method of claim 1, wherein the establishing the rate ingredients and the generating the at least one return shipment document are decoupled in performance such that the return recipient establishes the rate ingredients and the return shipper initiates generation of the at least one return shipment document.

7. The method of claim 1, wherein the establishing the rate ingredients and the generating the at least one return shipment document are decoupled in time such that the establishing the rate ingredients precedes the generating the at least one return shipping document by at least one day.

8. The method of claim 5, further comprising:
determining if the rate, as provided using the rate ingredients, for the return shipping of the item determined when authorizing the return shipping differs from a rate, as provided using the rate ingredients, for the return shipping of the item determined when a request is made for the generating at least one return shipment document.

9. The method of claim 5, wherein the generating the at least one return shipment document comprises:
if it is determined that the rate for the return shipping of the item determined when authorizing the return shipping differs from the rate for the return shipping of the item determined when the request is made for the generating at least one return shipment document, generating the at least one return shipment document using the rate for the return shipping of the item determined when the request is made for the generating at least one return shipment document.

10. The method of claim 5, wherein the generating the at least one return shipment document for return shipping of the item comprises:
determining that sufficient funds are available through the return recipient account for the at least one return shipment document; and
in response to determining that sufficient funds are not available through the return recipient account for the at least one return shipment document, initiating an automated refill transaction with respect to the return recipient account.

11. The method of claim 10, wherein the authorizing the return shipping at the return recipient's expense comprises:
determining that sufficient funds are available through the return recipient account for the return shipping of the item.

12. The method of claim 1, further comprising:
providing, under control of logic of the shipping management system, tracking of a return shipment of the item using information of the at least one return shipment document.

13. The method of claim 1, wherein the return shipper comprises a purchaser of an item from a merchant, and wherein the return recipient comprises the merchant, whereby the return shipping of the item to the merchant is provided to the purchaser at no cost to the purchaser.

14. A system for controlling generation of a return shipment document to prevent a return shipper from improperly generating or improperly using the return shipment document, the system comprising:
at least one database accessible to a shipping management logic and storing rate ingredients for subsequent generation of at least one return shipment document for a return shipment of an item; and
the shipping management logic operable to:
establish rate ingredients for subsequent generation of at least one return shipment document for return shipping of an item, wherein the rate ingredients include information regarding physical attributes of the item stored by the database;
provide, to a user device, a return shipment authorization token uniquely associated with the user device;
receive a request to generate the at least one return shipment document, wherein the request includes the return shipment authorization token and is received subsequent to establishing the rate ingredients and providing the return shipment authorization token, and wherein the return shipment authorization token is configured to authenticate the request;
determine a rate for the return shipping of the item based at least in part on the rate ingredients;
in response to authentication of the return shipment authorization token included in the request, generate the at least one return shipment document based on the determined rate for the return shipping of the item, wherein the at least one return shipment document is generated using an account of a return recipient to provide the return shipping of the item; and
transmit, to a return shipper client application, instructions to print the at least one return shipment document local, the at least one return shipment document being sufficient to establish proof of payment to a shipping service provider for the return shipping of the item by the return recipient.

15. The system of claim 14, wherein the at least one return shipment document comprises prepaid postage indicia and the return recipient account comprises a prepaid postage meter account.

16. The system of claim 15, further comprising:
an application programming interface (API) operable to provide data exchange between the shipping management logic and a postage system, whereby the shipping management logic is operable to pass credentials of the return recipient for the prepaid postage meter account to the postage system to generate the at least one return shipment document for the return shipper.

17. The system of claim 15, wherein the at least one return shipment document comprises a shipping label.

18. The system of claim 17, further comprising:
an order database accessible to the shipping management logic and storing information regarding an order for the item by the return shipper, whereby the shipping management logic is operable to populate at least one field of the shipping label utilizing information regarding the order for the item from the order database.

19. A non-transitory computer-readable storage medium storing instructions that, when executed by one or more processors, cause the one or more processors to perform operations for controlling generation of a return shipment document in a shipping management system to prevent a return shipper from improperly generating or improperly using the return shipment document, the operations comprising:
establishing rate ingredients for subsequent generation of at least one return shipment document for return shipping of an item, wherein the rate ingredients include information regarding physical attributes of the item stored by the shipping management system;

providing, to a user device, a return shipment authorization token uniquely associated with the user device;

receiving, subsequent to the establishing the rate ingredients and providing the return shipment authorization token, a request to generate the at least one return shipment document, wherein the request includes the return shipment authorization token, and wherein the return shipment authorization token is configured to authenticate the request;

determining a rate for the return shipping of the item based at least in part on the rate ingredients;

in response to authenticating the return shipment authorization token included in the request, generating the at least one return shipment document based on the determined rate for the return shipping of the item, wherein the at least one return shipment document is generated using an account of a return recipient to provide the return shipping of the item; and transmitting, to a return shipper client application, instructions to print the at least one return shipment document local, the at least one return shipment document being sufficient to establish proof of payment to a shipping service provider for the return shipping of the item by the return recipient.

20. The non-transitory computer-readable storage medium of claim 19, the operations comprising utilizing information, stored by the shipping management system, regarding an order for the item by the return shipper to populate at least one field of a shipping label when generating the at least one return shipment document.

* * * * *